United States Patent
Oort et al.

(10) Patent No.: US 7,028,559 B2
(45) Date of Patent: Apr. 18, 2006

(54) METHOD OF AND A DEVICE FOR ACOUSTICALLY MONITORING THE COURSE OF A PROCESS, SUCH AS A MILKING PROCESS

(75) Inventors: Dick M. Oort, Maassluis (NL); Karel Van den Berg, Bleskensgraaf (NL)

(73) Assignee: Lely Research Holding AG a Swiss Limited Liability Co., Zug (CH)

( * ) Notice: Subject to any disclaimer, the term of this patent is extended or adjusted under 35 U.S.C. 154(b) by 0 days.

(21) Appl. No.: 10/143,988

(22) Filed: May 14, 2002

(65) Prior Publication Data
US 2002/0129771 A1 Sep. 19, 2002

Related U.S. Application Data

(62) Division of application No. 09/302,483, filed on Apr. 30, 1999, now abandoned.

(51) Int. Cl.
*G01F 1/20* (2006.01)

(52) U.S. Cl. .................................. 73/861.18
(58) Field of Classification Search .............. 73/861.18, 73/861.47, 861.22, 861.23, 715, 716, 727, 73/195, 116
See application file for complete search history.

(56) References Cited

U.S. PATENT DOCUMENTS

| | | | | | |
|---|---|---|---|---|---|
| 4,322,982 A | * | 4/1982 | Muller et al. | ............ | 73/861.22 |
| 4,621,929 A | * | 11/1986 | Phillips | ........................ | 374/43 |
| 5,392,635 A | * | 2/1995 | Cadet et al. | ................ | 73/24.01 |
| 6,282,966 B1 | * | 9/2001 | Probst et al. | .................. | 73/715 |
| 6,422,093 B1 | * | 7/2002 | Feller | ...................... | 73/861.27 |

* cited by examiner

*Primary Examiner*—Harshad Patel
*Assistant Examiner*—Corey D. Mack
(74) *Attorney, Agent, or Firm*—Penrose Lucas Albrigh

(57) ABSTRACT

The invention relates to a method of acoustically monitoring the course of a process, in which method the amplitude difference and/or the intensity value of sound are/is measured during the process, and the amplitudes and/or the intensity values of the sound and/or the vibrations are measured continuously or with an adjustable frequency by means of a sound and/or vibration sensor (4), such as a piezoelectric transducer (12), during the entire process or part of the process and are compared mutually and/or with a predetermined threshold value and/or reference value and/or reference pattern for the purpose of drawing, on the basis thereof, conclusions in relation to the progress and/or the course of the process and/or the presence of disturbances and/or deviations in the course of the process.

21 Claims, 1 Drawing Sheet

METHOD OF AND A DEVICE FOR ACOUSTICALLY MONITORING THE COURSE OF A PROCESS, SUCH AS A MILKING PROCESS

This application is a Divisional of U.S. application Ser. No. 09/302,2483 filed Apr. 30, 1999 now abandoned.

FIELD OF INVENTION

The invention relates to a method of automatically monitoring a process, in which method the amplitude differences or the intensity values of sound, or both, are measured during the process, and the amplitudes or the intensity values of the sound of the vibrations or any combination thereof are measured, continuously or with an adjustable frequency by means of a sound or vibrating sensor, such as piezoelectric transducer, during the entire process or part of the process and are compared mutually or with a predetermined threshold value or reference value or reference pattern for the purpose of drawing, on the basis thereof, conclusions in relation to the progress and course of the process and the presence of disturbances and deviations in the course of the process. It has appeared that by means of a piezoelectric transducer, utilized in this case as a microphone, it is possible to establish in a relatively simple manner whether the process is being carried out satisfactorily.

SUMMARY OF THE INVENTION

According to the inventive feature, a threshold value is adjusted depending on the process involved and its stage. The above-mentioned method can in particular be applied for monitoring a milking process by means of a piezoelectric transducer, disposed in part of a milk line system or in a teat cup, wherein the amplitude or the intensity values or both of the sound which is produced by the air flow in the teat cup or in the milk line system when said teat cup is not connected and a milk vacuum has been applied in the milk line system are known and have been recorded as a reference value. By comparing this with the monitored sound, it can be deduced therefrom whether or not a teat cup has been correctly connected to a teat. It is also possible to check the piezoelectric transducer itself by comparing said reference value or reference pattern with newly obtained values or patterns or both. Furthermore it is possible to determine, on the basis of this threshold value, whether a teat cup is disconnected abruptly from a teat or has not been connected properly to the teat, as in the first case during the abrupt disconnection there is immediately obtained a high amplitude or intensity value or both which in the first case is approximately comparable to the threshold value, whereas in the second case an increase in amplitude can be observed which, however, is not as high as the threshold value.

The invention also relates to a sensor for measuring the amplitude differences or the intensity values of sound or both, said sensor being provided with a piezoelectric transducer adapted to the above-described method. Therefore, the invention further relates to a sensor for measuring the amplitude differences or the intensity values of sound or both, said sensor being provided with a piezo-sensor, such as a piezoelectric transducer, characterized in that the sensor comprises a housing which is made of material having a strongly absorbing capacity for sound or vibrations or both, such as silicones, for example, while at least one piezoelectric sensor is embedded in the housing. Using a strongly absorbing material prevents ambient sounds from affecting and disturbing measurements. For the purpose of obtaining a proper measurement, the piezo-sensor should be disposed relatively closely to a wall of the housing. In this manner sounds and vibrations to be measured are transmitted as optimally as possible to the piezo-sensor. In addition to silicones, other suitable materials may be used. According to again another inventive feature, the piezo-sensor comprises a guide element extending as far as near a wall of the housing or extending through said wall. The guide element enables the piezo-sensor to be embedded in the absorbing material at a greater distance from the wall without deterioration of proper transmissions of sound and vibrations to the piezo-sensor. In an embodiment of the invention, the guide element is designed as a recording needle that is connected to the piezoelectric transducer.

According to another inventive feature, the piezo-sensor is disposed in a chamber or closable cavity in the housing. In a preferred embodiment of the invention, said chamber or closable cavity is dimensioned in such a manner that it also comprises an air chamber. The presence of such an air chamber simplifies the vibration of the piezoelectric sensor, thus providing an optimal measurement. According to again another aspect of the invention, the piezo-sensor bears on a liquid or viscous layer, such as Vaseline or gel, for example, which has relatively good conductivity for vibrations and sound. Because the layer is liquid or viscous, the housing and this piezoelectric sensor fit perfectly to unevennesses in both the walls of the housing and of the sensor being filled with the layer. When the sensor is designed so as to have a closable cavity, according to an inventive feature the sensor comprises a closing element, such as a cap, for example, by means of which the cavity can be insulated from ambient sound. In a preferred embodiment of the invention, the closing element as well as the housing are made of strongly absorbing material. To obtain proper transmission of sound and vibrations to the piezo-sensor, according to an inventive feature, the closing element is designed as a pressure cap. In accordance with a further inventive feature, the pressure cap comprises a pressure portion acting on part of the sensor other than the measuring element thereof.

In addition to the circumstance that the above-mentioned sensor can be fastened to a part to be measured, such as a bearing housing, for example, by clamping the housing thereto, it is possible to provide the housing with a duct through which fluid can flow. In this manner it is possible to acquire acoustical measurements from the fluid flow through the housing. To minimize the influence of ambient sounds on the measurements to obtain proper measurements at a relatively low flow rates, according to a further inventive feature, it is advantageous that in or near the duct a flow disturbing element is provided that affects the fluid flow in at least part of the duct. Because the fluid is caused to whirl by said flow disturbing element, a better measurement can be obtained. The flow disturbing element does not necessarily have to be an additional element; positioning of the sensor closely to a bend in a line system may also produce such a disturbing effect.

In a preferred embodiment of the invention, the flow disturbing element comprises a sensor for a further measurement, such as a temperature or conductivity sensor.

The invention also relates to milking apparatus comprising a milk line system and teat cups, characterized in that the milking apparatus is suitable for the above-described method and is provided with a sensor as described above. In the case of a milking process being monitored, it is possible to provide such a sensor in one or more of the milk tubes of a teat cup. When such a sensor has been disposed in each of the teat cups or in each of the milk tubes, it is possible to obtain information for each udder quarter regarding the milking process. For example, each teat cup can be checked on whether it is leaking air because it has not properly been connected or has been unexpectedly kicked off. Additionally it is possible to obtain an indication as to the stage of the milking process at a given moment. For example, the foremilking, main milking and stripping stage can clearly be distinguished from each other. According to a further aspect of the invention, in this manner, it is possible to adapt the aforementioned reference value or reference pattern or threshold value or a combination thereof to the milking cycle itself, that is to select another value or another pattern for foremilking, main milking and stripping, or to adapt the aforementioned values and patterns for individual animals or for a group of animals. In this manner it is possible to obtain highly accurate measurements and consequently a highly accurate monitoring specifically for each teat or animal of group of animals. The aforementioned method and sensor are particularly suitable for a milking apparatus that is provided with a milking robot for automatically connecting teat cups to an animal to be milked, because with such a milking robot a supervising operator is not always present. Therefore, monitoring the milking process acoustically by means of the above-mentioned method and sensor may take place without the presence of an operator.

BRIEF DESCRIPTION OF THE DRAWINGS

The invention will now be explained in further detail with reference to the accompanying drawings, in which.

DETAILED DESCRIPTION OF THE PREFERRED EMBODIMENTS

Figure 1:
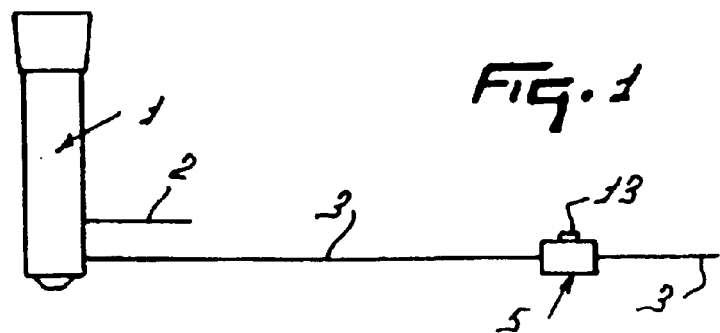
FIG. 1 diagrammatically shows a teat cup and part of a milk line system in which the sensor according to the invention is included.

FIG. 1 shows a teat cup 1 that is provided with a pulsation tube 2 and a milk tube 3. A sensor 4 is included in milk tube 3 for measuring amplitude differences or intensity values or both of sound. Teat cup 1 may constitute part of an automatic milking apparatus comprising a milking robot for automatically connecting teat cups to the teats of an animal to be milked.

Figure 2:
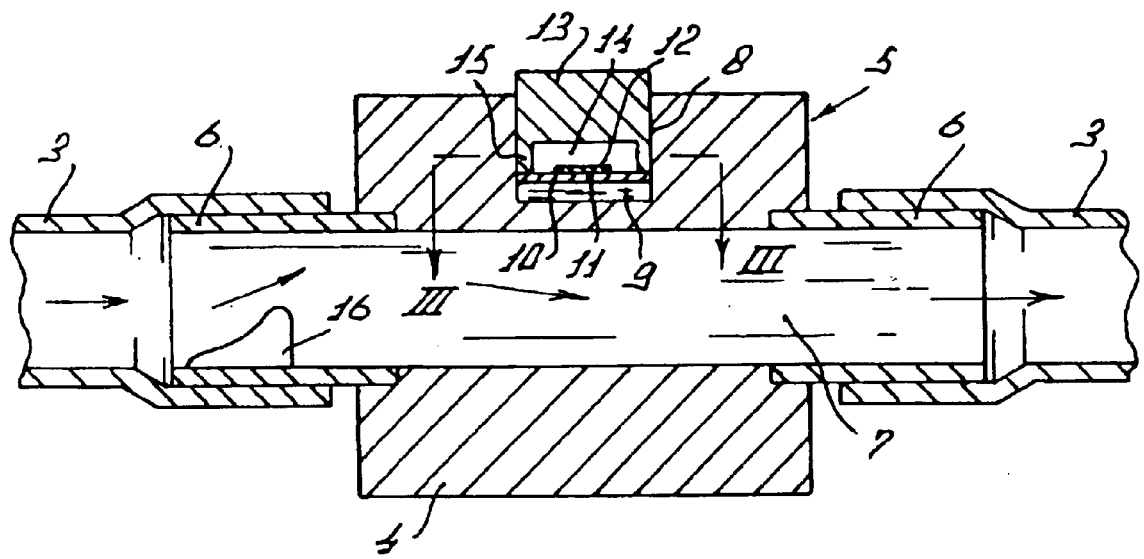
FIG. 2 is a side elevational cross-sectional view of the sensor according to FIG. 1.
Figure 3:
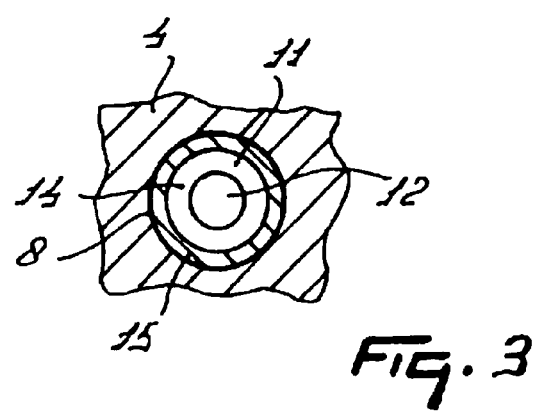
FIG. 3 is a top sectional plan view according to the arrows III—III in FIG. 2.

FIG. 2 is cross-section of sensor 4 according to FIG. 1. Sensor 4 comprises a housing 5 which is made of material having a strongly absorbing capacity for sound or other vibrations or both. On both sides of housing 5 are disposed two nipples 6 to which milk tube 3 is connected. In housing 5 there is further disposed a duct 7 through which the milk and other fluids such as cleaning liquids and air can flow. As shown in FIGS. 2 and 3, in housing 5 there is further provided a cylindrical cavity 8 extending to adjacent duct 7. A liquid or viscous layer 9 having a good conductivity for sound or vibrations or both is disposed in the lower side of cylindrical cavity 8. Layer 9 may consist of, for example, a petroleum jelly, such as Vaseline®. On layer 9, a piezo-sensor 10 is provided which comprises a circular brass plate 11 and a piezoelectric transducer 12 disposed thereon. In this case the piezoelectric transducer 12 is a crystal. Cylindrical cavity 8 is further closed by means of a closing element 13 which, in the present embodiment, is a pressure cap. Near its lower side pressure cap 13 is provided with a recess 14 having dimensions so that piezoelectric transducer 12 is disposed in an air chamber. As shown in FIGS. 2 and 3, near its lower side closing cap 13 comprises a ring-shaped pressure portion 15 by means of which brass plate 11 can be pressed on layer 9 in a manner so that a good contact exists between layer 9 and brass plate 11.

In one of nipples 6 a flow disturbing element in 16 is provided by means of which the laminar flow across at least part of the duct 7 is caused to whirl. In the present embodiment the flow disturbing element 16 comprises a temperature or conductivity sensor or a combination thereof.

Although we have disclosed the preferred embodiments of our invention, it is to be understood that it is capable of other adaptations and modifications within the scope of the following claims.

What is claimed is:

1. A vibration sensor for sensing and measuring sounds of fluids flowing through a conduit, which sensor comprises a housing composed of a sound insulating material that efficaciously absorbs vibrations produced by sounds, a conduit through said housing for receiving fluid flowing therethrough, a cavity in said housing which is hermetically sealed by a closing element, an insert in said cavity comprising a gas and a sound conductive viscous layer, and a piezo-electric material retained in a rigid manner between said gas and said sound conductive viscous layer, said cavity being spaced away from said conduit by said material of said housing by a distance which is not sufficient substantially to attenuate sounds emanating from fluids flowing through said conduit to be sensed by said piezo-electric material.

2. A vibration sensor in accordance with claim 1, which comprises a rigid means composed of a highly conductive material which separates said viscous layer from said piezo-electric material.

3. A vibration sensor in accordance with claim 2, wherein said highly sound conductive material is composed of brass.

4. A vibration sensor in accordance with claim 1, wherein said closing element comprises a pressure element.

5. A vibration sensor in accordance with claim 4, wherein said pressure element comprises a pressure cup which retains said piezo-electric material between said gas and said viscous layer in said rigid manner.

6. A vibration sensor in accordance with claim 4, wherein said closing element is composed of a material which is sound insulating.

7. A vibration sensor in accordance with claim 4, wherein said pressure element is entirely spaced away from said piezo-electric material.

8. A vibration sensor in accordance with claim 1, wherein said conduit and said cavity are both cylindrical and have longitudinal axes that are perpendicular to each other.

9. A vibration sensor in accordance with claim 1, wherein said gas is air and said fluid is a colloid.

10. A vibration sensor in accordance with claim 9, wherein said colloid comprises milk flowing from a teat cup.

11. A vibration sensor in accordance with claim 1, comprising a guide element which is disposed in said conduit closely adjacent to a wall of said housing.

12. A sensor in accordance with claim 1, wherein said viscous layer is comprised of petroleum jelly.

13. A vibration sensor for sensing and measuring sounds of fluids flowing through a conduit, which sensor comprises a housing composed of a sound insulating material that efficaciously absorbs vibrations produced by sounds, a conduit through said housing for receiving fluid flow therethrough, a cavity in said housing which is hermetically sealed by a closing element, a piezo-electric transducer rigidly retained within said cavity, said conduit and said cavity both being cylindrical and having respective longitudinal axes that are perpendicular to each other.

14. A vibration sensor in accordance with claim 13, comprising a liquid flow disturbing element in said conduit disposed closely adjacent to said piezo-electric transducer.

15. A vibration sensor in accordance with claim 13, comprising a viscous layer in said cavity disposed between said conduit and said piezo-electric transducer.

16. A vibration sensor in accordance with claim 13, wherein said closing element is composed of a material which is sound insulating.

17. A vibration sensor in accordance with claim 13, wherein said closing element comprises a pressure cap which is entirely spaced away from said piezo-electric transducer.

18. A vibration sensor for sensing and measuring sounds of a fluid flowing through a conduit, wherein the sensor comprises a piezo-sensor which is rigidly retained in a housing composed of a sound insulating material having a strong sound absorbing capacity, said housing being provided with a duct through which a fluid can flow, said duct being provided with a flow disturbing element for augmenting sound caused by the flow of a fluid through said duct in the vicinity of said flow disturbing element.

19. A vibration sensor in accordance with claim 18, wherein said flow disturbing element comprises sensing means.

20. A vibration sensor in accordance with claim 19, wherein said sensing means senses the temperature of fluid in said duct.

21. A sensor in accordance with claim 19, wherein said sensing means senses the electrical conductivity of fluid in said duct.

* * * * *